Patented Feb. 20, 1945

2,369,855

UNITED STATES PATENT OFFICE 2,369,855

INSECTICIDE

Henry J. Reynolds, Sumner, Wash.

No Drawing. Application November 8, 1941,
Serial No. 418,414

7 Claims. (Cl. 167—24)

This invention relates to an insecticide and more especially to an activated and stabilized insecticide containing rotenone and rotenone-like substances and a method of making the same.

A purpose of the invention is to provide a concentrated insecticide in the form of a paste which is practical, economical, stable and dependable and which can be applied with safety both to the user and the crops which it is sought to protect.

With this and other objects in view, the invention embraces broadly the concept of providing a concentrated insecticide in paste form which employs a finely ground root of a fish poisoning plant containing rotenone and rotenone-like substances as the active principle and which contains a resinocellulosic material preferably a wood flour as a synergist. The insecticide also contains a solvent for the purpose of extracting the active principles and a petroleum distillate as a contact agent. Precipitation of the active principles upon dilution with water to form a spray is prevented by the presence of an accessory solvent.

In the preferred process of making the insecticide the finely ground rotenone-bearing root and the wood flour are intimately mixed in a dry state. The accessory solvent is dissolved in the petroleum distillate and the extraction solvent is added to this solution. This liquid phase is then added to the dry mixture of finely ground root and wood flour and the ingredients are mixed until a homogenous paste results. The product is then ready to be packaged.

More specifically, in preparing the concentrated insecticide a rotenone-bearing root of a fish poisoning plant such as Derris, Lonchocarpus, Tephrosia, Mundulea is selected and finely ground. The selected root may contain 5% rotenone and rotenone-like substances such as deguelin tephrosin and toxicorol and certain gums, resins and glucosides resembling saponins. The use of rotenone and rotenone-like substances in their natural complexes has been found to be advantageous because it is the most stable form of these compounds. Moreover even the materials containing no insecticidal properties are utilized for the saponins are well known emulsifying and wetting agents and the resins both in the root and the selected wood flour act as stabilizer and resistors. The effectiveness of the insecticide is also increased by the fibers present in both the root and the flour as they act as carriers for the active principles.

The resinocellulosic material employed may be a dry wood flour and preferably the flour from kiln dried wood of the Douglas fir *Pseudotsuga taxifolia*. In addition to the advantages previously mentioned, it has been found that the wood flour if added in the proper proportions also acts as a synergist in the presence of the active principles. This action not only reduces the necessary concentration of toxic material but prolongs the torpor of the insects that do not receive a sufficient amount of the insecticide to produce death. The addition of this material, therefore, greatly increases the efficiency of the insecticide.

The extraction of the active principles is insured by the presence in the insecticide of a solvent for these complexes. It has been found that pine oil, acetone and some of the higher ketones such as methyl-isobutyl ketone and methyl-n-amyl ketone are especially suitable for this purpose.

It is also highly desirable to apply the rotenone in a suitable petroleum distillate since such material approaches an ideal contact agent. However, to prevent precipitation of the rotenone and rotenone-like substances it has been found necessary to add an ester of sulfonated bicarboxylic acid as an accessory solvent. In practice, a dioctyl ester of sodium sulfosuccinate is added. This accessory solvent makes it possible to provide a stable solution of the active principles in the petroleum oil which will not precipitate when the concentrate is diluted with water for spraying.

As a more specific illustration of the invention, the following formula prepared by the process previously described may be employed:

| | Percent by weight |
|---|---|
| Finely ground rotenone bearing root (5% rotenone) | 20 |
| Dry fir wood flour (200–350 mesh) | 20 |
| Pine oil | 20 |
| A dioctyl ester of sodium sulfosuccinate | 5 |
| Petroleum distillate | 35 |

The concentrated insecticide disperses readily in water producing a finely divided emulsion which breaks on application leaving a good deposit on the treated plants. The paste is designed to contain at least 1% rotenone, whatever other rotenone-like substances may be present.

The proportion of toxic material calls for a maximum dilution of one part in four hundred parts. It has been found, however, that dilutions of one part in a thousand parts is effective against many insects even when applied under field conditions. It is significant that effective sprays have been prepared from this paste having a rotenone content ranging from 1-80,000 to 1-100,000. Apparently, rotenone applied in this manner is nearly three times as effective as in the methods previously used. This effectiveness is undoubtedly due to a large extent to the synergistic action of the added wood flour.

While for purposes of illustration only one method of combining the ingredients which form the concentrated insecticide has been disclosed, it is obvious that variations may be made in this process without departing from the spirit of the invention. Moreover, the inventive concept includes changes in the proportions of the ingredients which are added to form the insecticide.

I claim:

1. A concentrated insecticide in dilutable paste form comprising a finely ground root of a fish poisoning plant containing as much as 5% rotenone and other active principles, a methyl isobutyl ketone for extracting the active principles, a petroleum distillate to serve as a contact agent, the dioctyl sodium ester of sulfosuccinic acid to prevent precipitation of the active principles, and a resino-cellulosic wood flour, said finely ground root and wood flour being present in substantially equal quantities by weight.

2. A concentrated insecticide in dilutable paste form comprising a finely ground root of a fish poisoning plant containing as much as 5% rotenone and other active principles, a methyl-n-amyl ketone for extracting the active principles, the petroleum distillate to serve as a contact agent, the dioctyl sodium ester of sulfosuccinic acid to prevent precipitation of the active principles, and a resino-cellulosic wood flour, said finely ground root and wood flour being present in substantially equal quantities by weight.

3. A concentrated insecticide in dilutable paste form comprising a finely ground root of a fish poisoning plant containing as much as 5% rotenone and other active principles, a solvent for extracting the active principles, a petroleum distillate to serve after application as a contact agent, the dioctyl ester of sodium sulfosuccinate to prevent precipitation of the active principles, and a resino-cellulosic wood flour, said finely ground root and wood flour being present in substantially equal proportions by weight.

4. A concentrated insecticide in dilutable paste form comprising a finely ground root of a fish poisoning plant containing as much as 5% rotenone and other active principles, a solvent for extracting the active principles, a petroleum distillate to serve as a contact agent, the dioctyl ester of sodium sulfosuccinic acid to prevent precipitation of the active principles, and a resino-cellulosic flour formed from the wood of the Douglas fir, said finely ground root and wood flour being present in substantially equal proportions by weight.

5. A concentrated insecticide in dilutable paste form comprising a finely ground root of a fish poisoning plant containing as much as 5% rotenone and other active principles, a pine oil for extracting the active principles, a petroleum distillate to serve as a contact agent, a dioctyl ester of sodium sulfosuccinate to prevent precipitation of the active principles and a resino-cellulosic flour made from the kiln dried wood of the Douglas fir as a synergist, said wood flour and group root being added in substantially equal proportions by weight.

6. A concentrated insecticide, in the form of a homogeneous paste, said insecticide being active when made into sprays having a rotenone content ranging as high as 1 part in 80,000 to 100,000 parts of spray, said paste consisting of approximately the following proportions by weight:

| | Percent |
|---|---|
| Finely ground rotenone bearing root containing as much as 5% rotenone | 20 |
| Dry fir wood flour (200-350 mesh) | 20 |
| Pine oil | 20 |
| A dioctyl ester of sodium sulfosuccinate | 5 |
| Petroleum distillate | 35 |

7. A concentrated insecticide in dilutable paste form comprising a finely ground root of a fish poisoning plant containing as much as 5% rotenone and other active principles, a ketonic solvent for extracting the active principles, a petroleum distillate to serve after application as a contact agent, a dioctyl ester of sodium sulfosuccinic acid to prevent precipitation of the active principles, and a resino-cellulosic wood flour, said finely ground root and wood flour being present in substantially equal proportions by weight.

HENRY J. REYNOLDS.